J. LESJAK.
GATE RELEASING DEVICE.
APPLICATION FILED SEPT. 18, 1920.
1,429,597.
Patented Sept. 19, 1922.
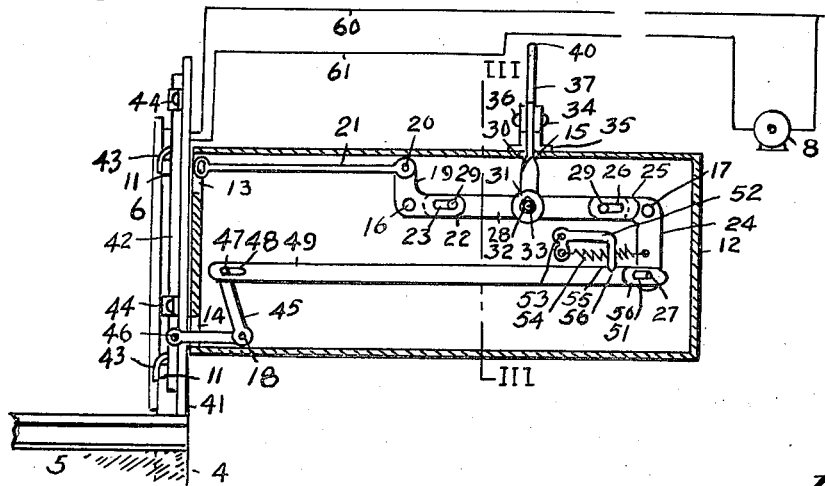
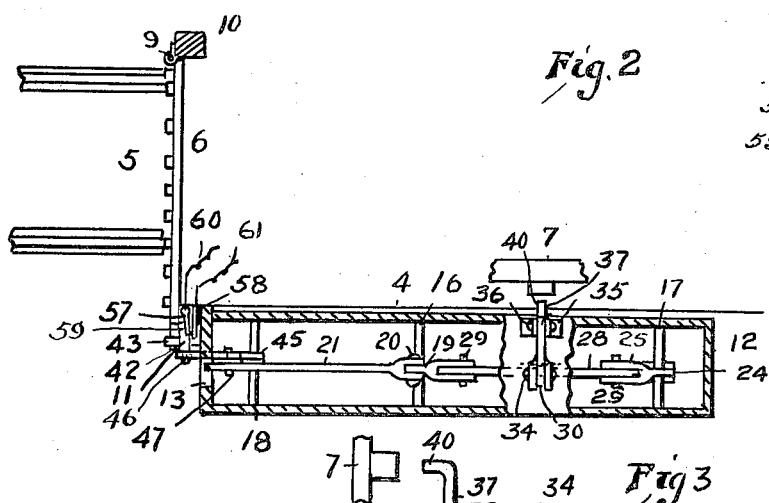
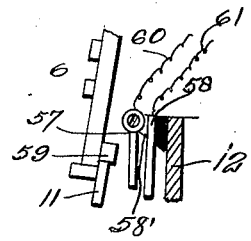
WITNESS
R. F. Dilworth
INVENTOR
Julius Lesjak
By Jas. P. Snyder
attorney Patented Sept. 19, 1922.

1,429,597

UNITED STATES PATENT OFFICE.

JULIUS LESJAK, OF SYGAN, PENNSYLVANIA.

GATE-RELEASING DEVICE.

Application filed September 18, 1920. Serial No. 411,198.

*To all whom it may concern:*

Be it known that I, JULIUS LESJAK, a citizen of the United States, residing at Sygan, in the county of Allegheny and State of Pennsylvania, have invented certain new and useful Improvements in Gate-Releasing Devices, of which the following is a specification.

This invention relates to a gate releasing device designed primarily for use at landings at mine shafts, but it is to be understood that the device can be employed for any purposes for which it is found applicable, and the invention has for its object to provide, in a manner as hereinafter set forth, a device of such class, with means whereby a gate for closing a landing to a mine shaft is not released to permit entrance to a cage operating in a shaft until the cage is at the landing, the cage acting as an abutment to cause the operation of the releasing mechanism to release the gate.

A further object of the invention is to provide a gate releasing device, in a manner as hereinafter set forth with an electric circuit making and breaking device actuated by the gate when the latter is closed to close the circuit to operate to enable the operation of the elevating motor for the cage, and to open the circuit when the gate is opened to prevent operation of the motor, under such conditions the cake cannot be elevated or lowered unless the landing is closed by the gate under such conditions reducing accidents to a minimum.

Further objects of the invention are to provide a gate releasing device for the purpose set forth which is comparatively simple in its construction, strong, durable, efficient in its use, conveniently operated when occasion requires, readily set up, and comparatively inexpensive.

With the foregoing and other objects in view the invention consists of the novel construction, combination and arrangement of parts as hereinafter more fully described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts through the several views:—

Figure 1, is a sectional elevation.

Figure 2, a sectional plan.

Figure 3, a section on line III—III Figure 1.

Figure 4 is an enlarged detail view of the latch operating mechanism.

Referring to the drawings in detail 4 denotes a shaft, 5 a landing, 6 a gate for closing the landing to the shaft 4, 7 indicates the cage which is elevated and lowered in the shaft 4, and 8 the motor for raising and lowering the cage 7.

The gate 6, is hinged as at 9, to the post 10, and is provided with a plurality of latches 11, engaged by a locking means, to be presently referred to, for the purpose of maintaining the gate 6 closed.

The reference numeral 12 denotes a casing, secured in the wall of the shaft in proximity to a landing, and having one end wall provided with a pair of openings 13, 14, and the top wall thereof formed with an opening 15. Supported by the side walls of the casing 12, are the pivot rods 16, 17 and 18. Mounted on the rod 16, is a bell crank 19, to one arm of which is attached, as at 20, an operating handle 21. The opening 13 is provided so that access can be had to the handle 21. The other arm of the bell crank 19, is bifurcated, as at 22 and slotted, as at 23.

Mounted on the rod 17, is a bell crank 24 having one arm bifurcated, as at 25 and slotted, as at 26. The other arm of the bell crank 24 is provided with a pin 27.

Extending into the bifurcated arms of the bell cranks 19 and 24, is a toggle link 28, having its ends provided with pins 29, which project through the slots 23, 24, whereby a pin and slot connection is set up between one end of the link and a bell crank.

Arranged within the casing 12, is a vertically disposed torsionally twisted link 30, which has a bifurcated lower end 31, which straddles and is loosely connected to the link 28. The bifurcated lower end of the link 30, has openings 32, through which project the pin 33, carried by the link 28. The openings 32 are of much greater diameter than the pin 33 to provide for the loose connection between the links 28 and 30. The link 30 extends up through the opening 15 and has attached to its upper end a pin 34.

Secured to the top of the casing 12, is a supporting bracket 35, to which is pivotally connected, as at 36, a bell crank 37, having one of its arms bifurcated, as at 38, and slotted as at 39. The pin 34 extends through the slots 39, whereby a pin and slot connection is set up between the bell crank 37 and the link 30. The other arm of the bell crank 37 is formed with a right angular extension 40, which is adapted to abut against the cage 7, to arrest movement of the bell crank 37 whereby the mechanism will be operated to release the gate 6 as the handle 21 is pulled outwardly.

Secured to a post 41 arranged opposite the post 10, is a vertically movable locking bar 42, having a plurality of keeper members 43, which when the bar 42 is lowered, overlap and lock the latches 11 from movement, under such conditions locking the gate, and the latter is retained in such position until the locking bar 42, is elevated to release the latches 11. Guide members 44 are provided for securing the bar 42 to, as well as guiding it on the post 41.

Mounted on the rod 18, is a bell crank 45, having one of its arms extended through the opening 14 and pivotally attached to the bar 42, as at 46. The other arm of the bell crank 45 is provided with a pin 47, which extends through the slot 48, in the forward end of the elongated actuating arm 49, the latter has its rear end bifurcated, as at 50, and slotted as at 51. The bifurcated rear end of the arm 49, straddles the lower arm of the bell crank 24, and the pin 27 extends through the slots 51, whereby a pin and slot connection is set up between the bell crank 24 and the arm 49. When the lower arm of the bell crank 24 moves rearwardly the arm 49 is carried therewith, the bell crank 45 actuated so that the lower arm thereof will move upwardly. Under such conditions the bar 42 will be raised and the keeper members shifted clear of the latches 11, whereby the gate can be swung to open position.

To prevent the surreptitious elevating of the bar 42, a latching element is provided for the arm 49. The latching element consists of a bell crank 52, pivotally supported as at 53, by the side walls of the casing 12, and has one of its arms connected by a spring 54 to the lower arm of the bell crank 24. The other arm of the bell crank 52 is provided with a depending lug 55, which engages in a seat or notch 56, in the top edge of the arm 49. If an attempt is made to shift the arm 49 rearwardly so as to actuate the bell crank 45 to elevate the bar 42, or an effort made to elevate the bar 42, the lug engaging in the notch 56, will arrest movement of the bar.

When the gate 6 is closed the circuit, employed for operating the motor 8, to elevate or lower the cage 7, is closed, but when the gate is open, the circuit is open. The gate when closed operates a resilient spring metal circuit making and breaking arm 57, to force and hold it against a contact 58, and for this purpose the gate 6 is provided with a protuberance 59. The arm 57 and the contact 58 are carried by a support 58′, constructed from insulating material, and secured to the casing 12. Circuit wires 60, 61, lead respectively from the arm 57 and contact 58 to the motor 8. When the protuberance 59 is moved clear of the arm 57, the latter automatically shifts, owing to its resiliency, from the contact 58 and the circuit is open.

If the handle 21, be pulled outwardly when the cage 6, is not at the landing 5, no abutment will be in the path of the upper arm of the bell crank 37, and the loose connections between the various elements will prevent the actuating of the bell crank 24 to shift the arm 49, but if the said upper arm of the bell crank 37 abuts against the cage, arresting movement of said bell crank 37, the toggle elements will cause the operation of the bell crank 24 whereby the spring 54 will be tensioned to actuate the bell crank 54 and lift the lug 55 from engagement with the notch 56 in the bar 49, and permit of the latter to shift rearwardly to move the bell crank 45, and elevate the bar 42 to release the latches 11. The lug 55 engages the notch 56 by gravity when the bar 49 again assumes its normal position.

What I claim is:—

1. A device for the purpose set forth comprising the combination with a normally locked gate having a plurality of latches, of a vertically movable locking bar provided with keeper members associated with the latches to maintain the gate closed, a bell crank lever connected to said bar, an actuating arm having one end attached to said lever, and a toggle lever mechanism connected with said arm and adapted to actuate said arm and to have the movement of certain of its elements arrested to cause the operation of the other of its elements and said bar and bell crank whereby said bar is shifted upwardly to open the latches.

2. A device for the purpose set forth comprising the combination with a normally locked gate having a plurality of latches, of a vertically movable locking bar provided with keeper members associated with the latches to maintain the gate closed, a bell crank lever connected to said bar, an actuating arm having one end attached to said lever, a toggle lever mechanism connected with said arm and adapted to actuate said arm and to have the movement of certain of its elements arrested to cause the operation of the other of its elements and said bar and bell crank whereby said bar is shifted upwardly to open the latches, and a latching device for said arm.

In testimony whereof I affix my signature.

JULIUS LESJAK.